United States Patent [19]

Kuijk

[11] Patent Number: 4,994,796
[45] Date of Patent: Feb. 19, 1991

[54] ELECTRO OPTICAL DISPLAY DEVICE WITH REDUNDANT SWITCHING MEANS

[75] Inventor: Karel E. Kuijk, Eindhoven, Netherlands

[73] Assignee: U.S. Philips Corporation, New York, N.Y.

[21] Appl. No.: 208,184

[22] Filed: Jun. 16, 1988

[30] Foreign Application Priority Data

Jun. 18, 1987 [NL] Netherlands .................. 8701420
Jan. 28, 1988 [NL] Netherlands .................. 8800204

[51] Int. Cl.⁵ .................................. G09G 3/36
[52] U.S. Cl. ............................ 340/784; 340/719; 340/765; 350/333
[58] Field of Search ............... 340/719, 784, 805, 785, 340/786, 787, 788, 771, 752, 765; 350/330, 331 R, 332, 333, 334

[56] References Cited

U.S. PATENT DOCUMENTS

| | | | |
|---|---|---|---|
| 3,654,606 | 4/1972 | Marlowe et al. | 340/784 |
| 4,223,308 | 9/1980 | Baraff et al. | 340/784 |
| 4,251,136 | 2/1981 | Miner et al. | 340/784 |
| 4,641,135 | 2/1987 | Hilbrink | 340/784 |
| 4,728,172 | 3/1988 | Cannella | 340/784 |
| 4,731,610 | 3/1988 | Baron et al. | 340/784 |
| 4,748,445 | 5/1988 | Togashi et al. | 340/784 |
| 4,794,385 | 12/1988 | Kuigk | 340/784 |
| 4,810,051 | 3/1989 | Kuijk | 340/784 |

Primary Examiner—Alvin E. Oberley
Assistant Examiner—M. Fatahiyar
Attorney, Agent, or Firm—John C. Fox

[57] ABSTRACT

In a picture display device driven with an active matrix the voltage across the picture elements is accurately adjusted by discharging or charging the associated capacitances, if necessary, first to beyond the transition range in the transmission/voltage characteristic. Redundancy is advantageously used in the switching units employed for this purpose.

20 Claims, 4 Drawing Sheets

ELECTRO OPTICAL DISPLAY DEVICE WITH REDUNDANT SWITCHING MEANS

BACKGROUND OF THE INVENTION

The invention relates to a display device comprising an electro-optical display medium between two supporting plates, a system of picture elements arranged in rows and columns, with each picture element being formed by picture electrodes arranged on the facing surfaces of the supporting plates, and a system of row and column electrodes for presenting selection and data signals by means of which a range of voltages dependent on the electro-optical display medium can be presented across the picture elements for the purpose of picture display.

A display device of this type is suitable for displaying alphanumerical information and video information by means of passive elector-optical display media such as liquid crystals, electrophoretic suspensions and electrochromic materials.

A display device ofthe type described in the opening paragraph is known from U.S. Pat. No. 4,811,006, issued March, 1989, in the name of the Applicant. In the device shown in this Application diodes are used as non-linear switching elements in an active matrix, namely two diodes per picture element. Two successive rows of picture elements each time have one row electrode in common. The drive mode is such that in television applications (for example, with a drive mode in accordance with the PAL or NTSC system) the information of two successive even and odd lines is presented across each picture element at an alternating polarity and at the field frequency. The information of a picture element is therefore determined by the average signal of two successive even and odd lines. Since each time two rows of picture electrodes are simultaneously written, because two successive rows each time have one row electrode in common, such a device provides little flexibility as regards the choice of colour filters to be used. In fact, this choice is limited to strip-shaped colour filters.

U.S. patent application Ser. No. 208,185, filed Jun. 16, 1988; in the name of the Applicant describes a picture display device of the type mentioned in the opening paragraph in which the row electrodes are not common and in which the rows of picture elements are separately driven without the omission of common row electrodes, leading to an increase of the number of connections.

This ensures a considerable freedom in the choice of the colour filters to be used.

This is possible by giving the picture elements a given adjustment per row by charging or discharging the capacitances associated with these picture elements after first having discharged or charged them too far (whether or not accurately).

To this end such a picture display device comprises means to apply, prior to selection, an auxiliary voltage across the picture elements beyond or on the limit of the voltage range to be used for picture display.

In the embodiment shown in the said Patent Application diodes are used as non-linear switching elements.

OBJECT AND SUMMARY OF THE INVENTION

The present invention has for its object to provide a device of the type described in the opening paragraph having a high yield which is also realized by the fact that a satisfactorily operating switching unit is substantially always present.

The invention is based on the recognition that this can be achieved with redundancy-increasing measures known per se without affecting the operation of the display device, notably with respect to grey scale adjustment.

To this end a device according to the invention is characterized in that the picture electrodes on one of the supporting plates are electrically connected to the common point of two non-linear switching units which are arranged in series between a column electrode for data signals and an electrode for applying, prior to selection, a reference voltage resulting in; an auxiliary voltage across the picture elements beyond or on the limit of the voltage range to be used for picture display, while at least one non-linear switching unit comprises a plurality of non-linear switching elements.

As a result of such built-in redundancy, it appears that the risk of faulty switching units is reduced by a factor of 100 to 1000 and that the yield is increased by the same factor in the manufacture of such a display device.

The switching units may comprise series arrangements or parallel arrangements of non-linear switching elements, but also combinations thereof.

The auxiliary voltage is, for example, a fixed reference voltage so that all picture elements in a row are first charged negatively or positively to a fixed value and are subsequently charged or discharged to the correct signal value, dependent on the data signals presented.

Since this is effected for each individual row without a subsequent row or a previous row being influenced, the picture information can be adapted to a colour filter to be used, which colour filter may be composed of, for example, triplets as described, for example, in U.S. Pat. No. 4,908,609 in the name of the Applicant, or it may have, for example, a diagonal structure.

Discharging and charging prior to the actual driving operation with the picture information can be effected during the same line period in which the picture information is presented, but also during the preceding line period.

Since each row of picture elements is now separately written, the voltage across these picture elements can also be inverted per row, which leads to a higher faceflicker frequency and hence to a steadier picture.

BRIEF DESCRIPTION OF THE DRAWING

The invention will now be described in greater detail, by way of example, with reference to the accompanying drawings in which

FIG. 6 shows a modification of the arrangement of FIG. 4a;

The Figures are diagrammatic and not to scale. Corresponding components are usually denoted by the same reference numerals.

DESCRIPTION OF THE PREFERRED EMBODIMENTS

Figure 1:
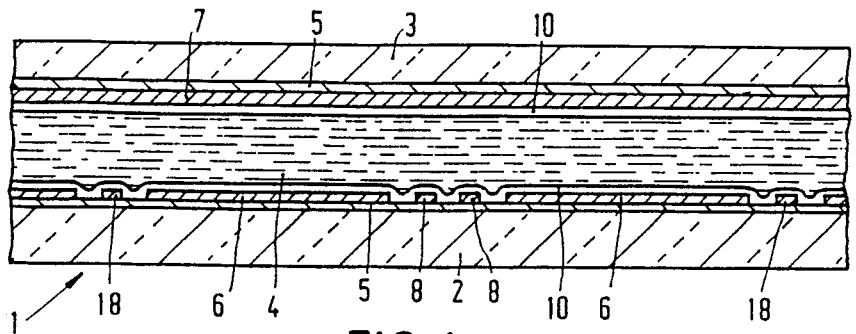
FIG. 1 is a diagrammatic cross-section of a portion of an electro-optic display device, taken on the line I—I in FIG. 2.
Figure 2:
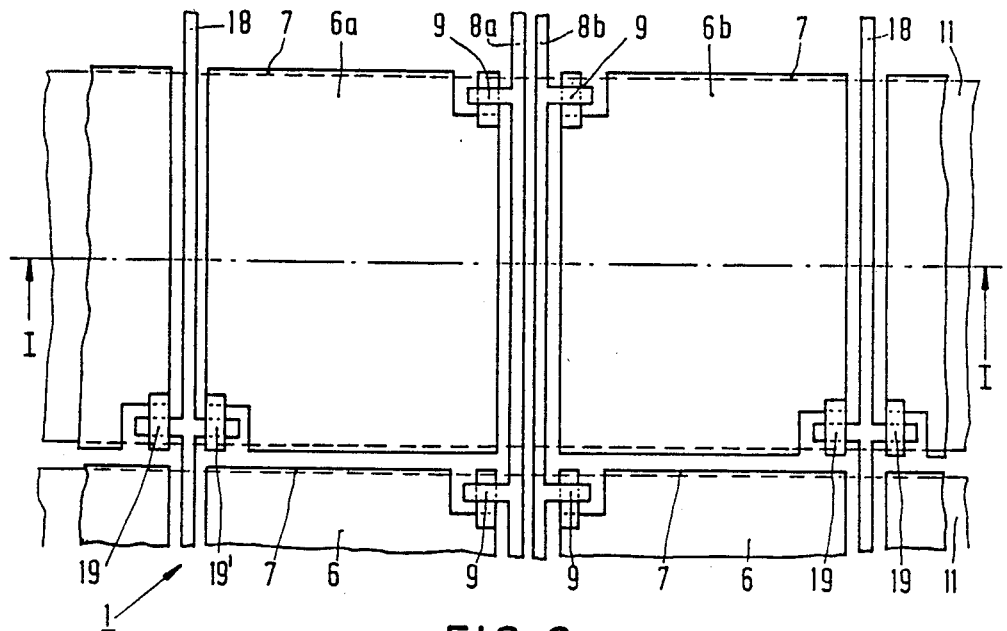
FIG. 2 is a diagrammatic plan view of the device of FIG. 1.

FIGS. 1 and 2 show in a diagrammatic cross-section and in a plan view respectively, a part of a liquid crystal display device 1, which has two supporting plates 2 and 3, between which, for example, a twisted nematic or a ferro-electric liquid crystalline material 4 is present. The inner surfaces of the supporting plates 2 and 3 have electrically and chemically insulating layers 5. A plurality of row and column-arranged picture electrodes 6 of indium tin oxide or another electrically conducting transparent material is provided on the supporting plate 2. Likewise, transparent counter electrodes 7 of, for example, indium tin oxide which are in the form of strip-shaped row electrodes 11, are provided on the supporting plate 3. The facing picture electrodes 6, 7 form individually controllable display cells which constitute the picture elements of the display device.

Strip-shaped column electrodes 8 are arranged between the columns of picture electrodes 6. Each picture electrode 6 is connected to a column electrode 8 by means of a switching unit, in this embodiment a diode 9 diagrammatically shown in FIG. 2. As is apparent from FIG. 2, the associated column electrodes 8a, 8b are arranged between two picture electrodes 6a, 6b. Liquid crystal orienting layers 10 are also provided on the inner surfaces of the supporting plates 2 and 3 over the various electrodes. As is known, another orientation state of the liquid crystal molecules and hence an optically different state can be obtained by applying a voltage across the liquid crystal layer 4. As is also known, the display device may be realized as a transmissive or a reflective device and may be provided with one or two polarizers for this purpose.

Auxiliary electrodes 18, each of which has two picture electrodes 6 in common in this embodiment, are arranged on the side of the picture electrodes 6 opposite from that of the column electrodes 8. The auxiliary electrodes 18 connect the picture electrodes 6 to a reference voltage via other switching units, in this embodiment diodes 19, which are diagrammatically shown in FIG. 2. This reference voltage is chosen to be such that, dependent on the voltages used on the selection line (counter electrodes 11) and the electro-optical material used, the capacitance associated with the picture element can always be discharged via the diode 19 to a voltage value beyond or on the limit of the range of transition in the transmission/voltage characteristic of the relevant electro-optical material.

Figure 3:
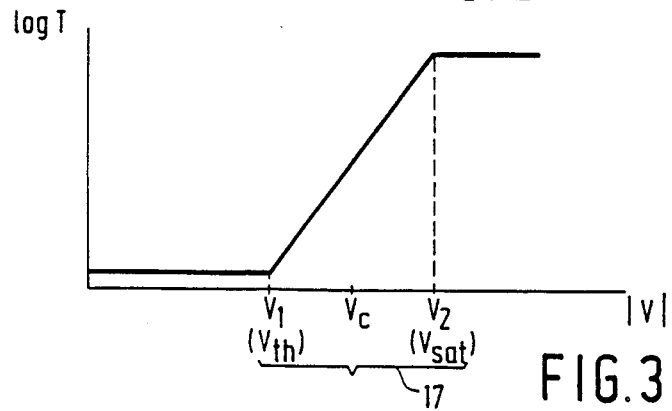
FIG. 3 shows the associated transmission/voltage characteristic of a display cell of the device of FIG. 1.

FIG. 3 shows diagrammatically a transmission/voltage characteristic of a display cell as it occurs in the display device of FIGS. 1, 2. Below a given threshold voltage ($V_1$ or $V_{th}$) the cell substantially passes no light, whereas above a given saturation voltage ($V_2$ or $V_{sat}$) the cell is substantially entirely transparent. The intermediate range constitutes the above-mentioned range of transition and is indicated in FIG. 3 by bracket 17. In this respect it is to be noted that the absolute value of the voltage is plotted on the abscissa, because such cells are usually driven at an alternating voltage.

Figure 4A:
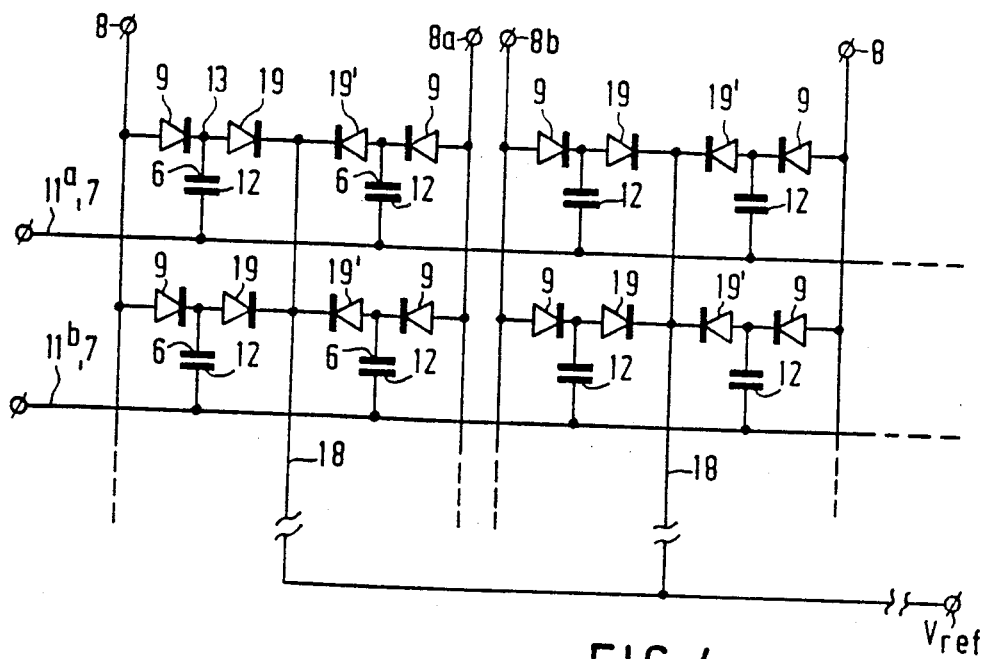
FIG. 4a and 4b are diagrammatic schematic representations of a device of the type shown in FIGS. 1 and 2.
Figure 4B:
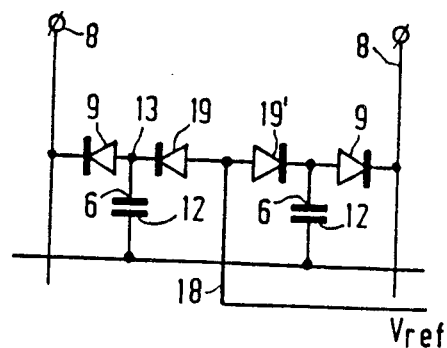

FIGS. 4a and 4b show diagrammatically a display device of the type shown in FIGS. 1, 2. Picture elements 12 constituted by facing picture electrodes 6 and row electrodes 7, 11 at one end, which together with the column electrodes 8 are arranged in the form of a matrix. The picture elements 12 are connected to column electrodes 8 via diodes 9. They are also connected via diodes 19 to an auxiliary electrode 18, which is common to two diodes 19, 19'.

Figure 5A:
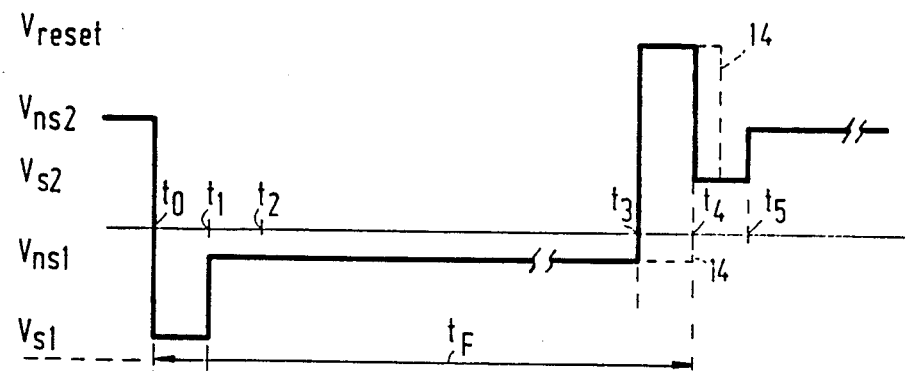
FIG. 5 is a diagrammatic representation of some appropriate drive signals for operation of such a device.
Figure 5B:
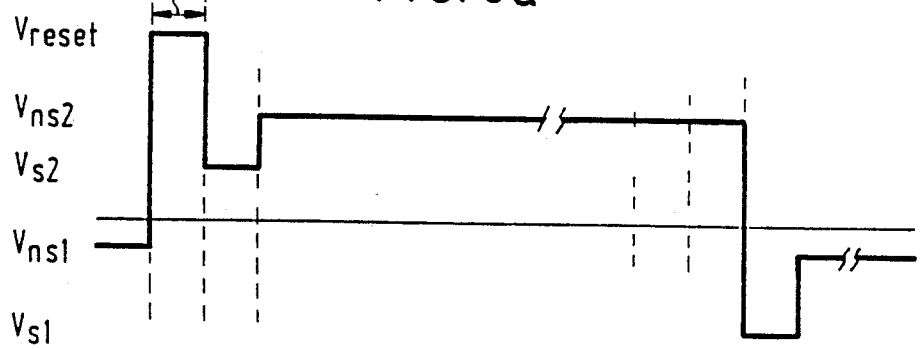
Figure 5C:
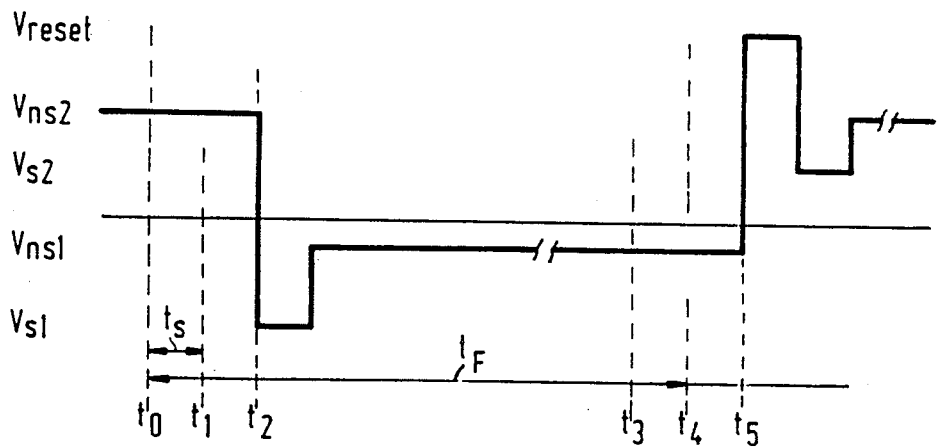

FIGS. 5a–c show how the drive signals are chosen for a plurality of rows of picture elements 12 in order to write them with picture information which changes sign during each field (for example, in TV applications).

For writing information, a first selection voltage $V_{s1}$ (see FIG. 5a) is presented on a selection line 11 during a selection period $t_s$, while the information or data voltages $V_d$ are simultaneously presented on the column electrodes 8; this leads to a positive voltage across a picture element 12 which represents the information presented.

To prevent degradation of the liquid crystal and to be able to increase the so-called face-flicker frequency, information having an alternating sign is preferably presented across the picture element 12. In a device according to the invention a negative voltage across the picture element 12, which represents the information presented, is achieved by presenting a second selection voltage $V_{s2}$ while simultaneously presenting inverted data voltages ($-V_d$) after having discharged the capacitance associated with the picture element 12 too far (or having negatively charged it too far).

From the instant $t_0$ (see FIG. 5a) a selection voltage $V_{s1}$ is presented on a row electrode 11 during a selection period $t_s$ (which in this example is chosen to be equal to a line period for TV applications, namely 64 $\mu$sec) while information voltages or data voltages $V_d$ are simultaneously presented on the column electrodes 8. After the instant $t_1$ the row of picture elements 12 is no longer selected because the row electrode 11 receives a voltage $V_{ns1}$. This voltage is maintained until just before the next selection of the row of picture elements 12. In this example this is effected by giving the selection line 11 a reset voltage just before selecting the first row of picture elements 12 again, namely at an instant $t_3 = t_f - t_s$ in which $t_f$ represents a field period. The reset voltage and a reference voltage presented on the common point of the diodes 9, 19' can then be chosen to be such that the picture elements 12 are charged negatively to such an extent that the voltage across the row of picture elements lies beyond the range to be used for picture display (to a value of $\leq -V_{sat}$). In a subsequent selection period (from $t_4$) they are then charged to the desired value determined by data voltages $-V_d$. To this end the row electrodes receive the voltage $V_{s2}$ and after the selection period (after $t_5$) has elapsed, they receive a non-selection voltage $V_{ns2}$. In this way the voltage across the picture elements is inverted during each field period.

FIG. 5b shows the same voltage variation as FIG. 5a, but is then shifted over a field period plus a selection period (in this case a line period). This provides the possibility of writing two successive rows of picture elements with inverse data voltages with respect to each other. FIG. 5c is identical to FIG. 5a, but is shifted over two selection periods.

For (television) pictures with half the vertical resolution in which the lines of the even and the odd field are written over each other, it is achieved that the picture information changes its sign and is refreshed once per field period. Although the line-flicker frequency is 25 Hz (30 Hz) in this case, a face-flicker frequency of 50 Hz (60 Hz) is achieved between successive rows due to the phase difference of 180° introduced by changing the sign per row.

The selection voltages $V_{s1}$ and $V_{s2}$ may of course also be chosen to be shorter than one line period (64 μsec). In this case the reset voltage may alternatively be presented during a part of the line period in which selection takes place, provided there is sufficient time left to charge the picture elements 12. The voltage variation on the electrodes 11 is then effected, for example, in the way as shown diagrammatically in FIG. 5a by means of the broken line 14.

The device shown is very suitable for using a drive method in which the average voltage across a picture element $$V_c = \frac{V_{sat} + V_{th}}{2}$$

(see FIG. 3) so that the absolute value of the voltage for the purpose of picture display across the picture elements 12 is substantially limited to the range between $V_{th}$ and $V_{sat}$.

A satisfactory operation as regards grey scales is obtained if, dependent on the data voltages $V_d$ on the column electrodes 8, the voltage values across the picture elements 12 are at most $V_c + V_{dmax} = V_{sat}$ and at least $V_c - V_{dmax} = V_{th}$. Elimination of $V_c$ yields: $|V_d|_{max} = \frac{1}{2}(V_{sat} - V_{th})$, that is to say, $-\frac{1}{2}(V_{sat} - V_{th}) \leq V_{dmax} \leq \frac{1}{2}(V_{sat} - V_{th})$.

In order to charge a row of picture elements 12, for example, positively, the associated row electrode 11 is given a selection voltage $V_{s1} = -V_{on} - \frac{1}{2}(V_{sat} + V_{th})$ in which $V_{on}$ is the forward voltage of the diode 9. The voltage across the picture element 12 is therefore $V_d - V_{on} - V_{si}$; it ranges between $$-\frac{1}{2}(V_{sat} - V_{th}) + \frac{1}{2}(V_{sat} + V_{th}) = V_{th}$$

and $$\frac{1}{2}(V_{sat} - V_{th}) + \frac{1}{2}(V_{sat} + V_{th}) = V_{sat},$$

dependent on $V_d$.

In order to negatively charge the same row of picture elements 12 (in a subsequent field or frame period) at a subsequent selection with inverted data voltages, these are first charged negatively too far by means of a reset voltage $V_{reset}$ on the row electrode 11 via diodes 19 connected to the reference voltage. Subsequently the selected row electrode receives a selection voltage $V_{s2} = V_{on} + \frac{1}{2}(V_{sat} + V_{th})$ (in the same line period or in a subsequent line period). The picture elements 12 which are negatively charged too far are now charged via the diodes 9 to $V_d - V_{on} - V_{s2}$, that is to say, to values between $$-\frac{1}{2}(V_{sat} - V_{th}) - \frac{1}{2}(V_{sat} - V_{th}) = -V_{sat}$$

and $$\frac{1}{2}(V_{sat} - V_{th}) - \frac{1}{2}(V_{sat} - V_{th}) = -V_{th},$$

so that information with the opposite sign is presented across the picture elements 12.

In the case of non-selection the requirement must be satisfied that neither diodes 9 nor diodes 19 can conduct, in other words, for the voltage $V_A$ at the junction point 13 it must hold that $V_a \geq V_d$ and $V_A \leq V_{ref}$ or $V_{Amin} \geq V_{Dmax}(1)$ and $V_{Amax} \leq V_{ref}(2)$.

For the lowest non-selection voltage $V_{ns1}$ it then holds that (1) $V_{Amin} = V_{ns1} + V_{th} \geq V_{Dmax} = \frac{1}{2}(V_{sat} - V_{th})$, or $V_{ns1} \geq \frac{1}{2}(V_{sat} - V_{th}) - V_{th}$ (3).

It follows from (2) that:

$V_{ns1} + V_{sat} \leq V_{ref}$ or $V_{ns1} \leq V_{ref} - V_{sat}$ (4).

Combination of (3) and (4) yields:

$V_{ref} - V_{sat} \geq V_{ns1} \geq \frac{1}{2}(V_{sat} - V_{th}) - V_{th}$ $V_{ref} \geq 3/2(V_{sat} - V_{th})$ (5).

For the highest non-selection voltage $V_{ns2}$ it similarly holds that:

$V_{Amin} = V_{ns2} - V_{sat} \geq \frac{1}{2}(V_{sat} - V_{th})$ or $V_{ns2} \geq \frac{1}{2}(V_{sat} - V_{th}) + V_{sat}$ (3') and $V_{ns2} - V_{th} \leq V_{ref}$ or $V_{ns2} \leq V_{ref} + V_{th}$ (4').

Combination of (3') and (4') yields:

$V_{ref} + V_{th} \geq V_{ns2} \geq \frac{1}{2}(V_{sat} - V_{th}) + V_{sat}$ or $V_{ref} \geq 3/2(V_{sat} - V_{th})$ (5).

The reference voltage $3/2(V_{sat} - V_{th})$ thus suffices to block the diodes 19, 19' after writing both data and inverted data by the method described above. In summary it holds for the voltages $V_{ns1}$, $V_{s1}$, $V_{ref}$ and $V_{reset}$ that:

$V_{s1} = -V_{on} - \frac{1}{2}(V_{sat} + V_{th});$ $V_{s2} = -V_{on} + \frac{1}{2}(V_{sat} + V_{th});$ $V_{ns1} = \frac{1}{2}(V_{sat} - V_{th}) - V_{th};$ $V_{ns2} = \frac{1}{2}(V_{sat} - V_{th}) + V_{sat};$ $V_{ref} = 3/2(V_{sat} - V_{th});$ $V_{res} = V_{on} + 5/2\ V_{sat} - 3/2\ V_{th}.$ When reversing the sign of the diodes 9, 19 as is diagrammatically shown in FIG. 4a, the same type of drive mode may be used. Similar relations, be it with reversed sign, then apply to the drive signals.

Figure 6:
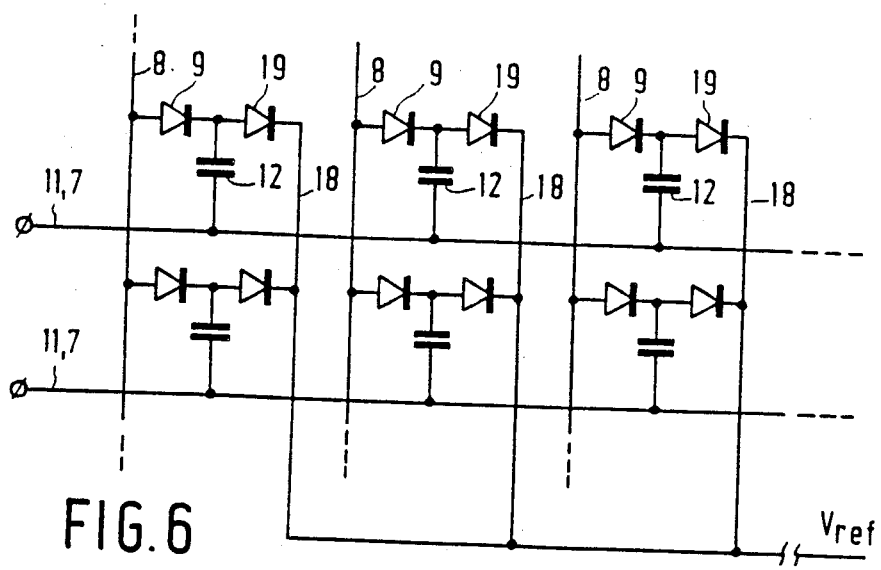

FIG. 6 shows diagrammatically a modification of the device of FIG. 4a in which per column of picture elements both a column electrode 8 and an auxiliary electrode 18 is present. Otherwise the reference numerals have the same significance as in the previous embodiment. The drive mode is also identical.

As has been stated, the advantage of such a device is, inter alia, that each row of picture elements can be separately driven without extra connection lines being required and with a free choice as regards the colour filters to be used.

In the embodiments described above the devices comprise two switching units, in this case the diodes 9, 19, for each picture element 12. To reduce the risk of poorly functioning picture elements due to non-functioning or poorly functioning switching elements, redundancy is used; for example, two diodes may be arranged in parallel to neutralize the consequences of open connections and two diodes may be arranged in series to neutralize the consequences of a short-circuited diode.

Figure 7:
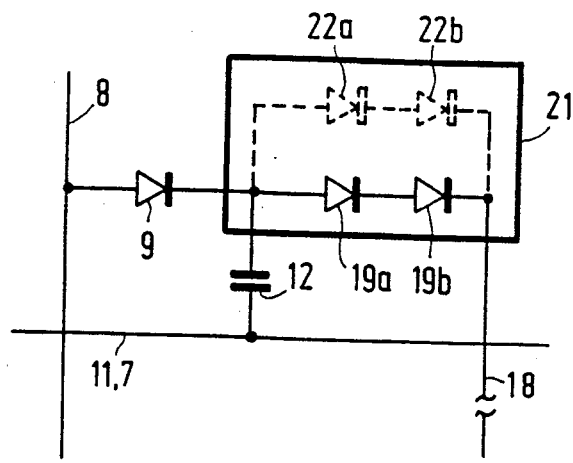
FIG. 7 shows a first modification of the arrangement of FIG. 4a using redundancy measures according to the invention.

FIG. 7 shows a way in which for a single picture element 12 a switching unit 21 connects the picture element 12 to the auxiliary electrode 18 for the reference voltage. The switching unit comprises two series-arranged diodes 19a, 19b. The reference voltage is adapted in such a way that despite the additional voltage drop across the second diode the picture elements can be negatively charged so far that the voltage across the picture elements lies again beyond the range to be used for picture display (up to a value of $\leq -V_{sat}$) and is subsequently charged to the desired value in the same way as described with reference to FIGS. 4 and 5. If one of the diodes 19a, 19b is short-circuited, the relevant picture element 12 is negatively charged to a slightly further extent, but is still charged to the desired value in the subsequent selection period. Hence, such a short circuit does not affect the operation of the display device.

Another error which may occur is an open connection. This can be neutralized by arranging one or more switching elements in parallel with the diode circuit. This is diagrammatically indicated by means of the diodes 22a, 22b in the relevant embodiment.

Figure 8:
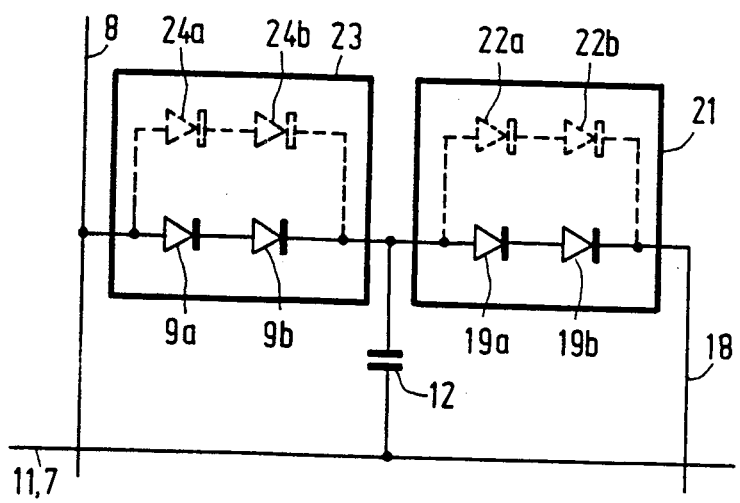
FIG. 8 shows a second modification according to the invention.

In FIG. 8, switching units 9a, 9b, in this embodiment diodes, are arranged in the switching unit 23 so as to neutralize the consequences of a short-circuited diode. In order to cope with the effect of an additional diode in the switching unit, the above-derived selection voltages (for the configuration of FIG. 4a) must be corrected by an amount of $-V_{on}$, both when charging the display element negatively and when charging it positively.

Figure 9:
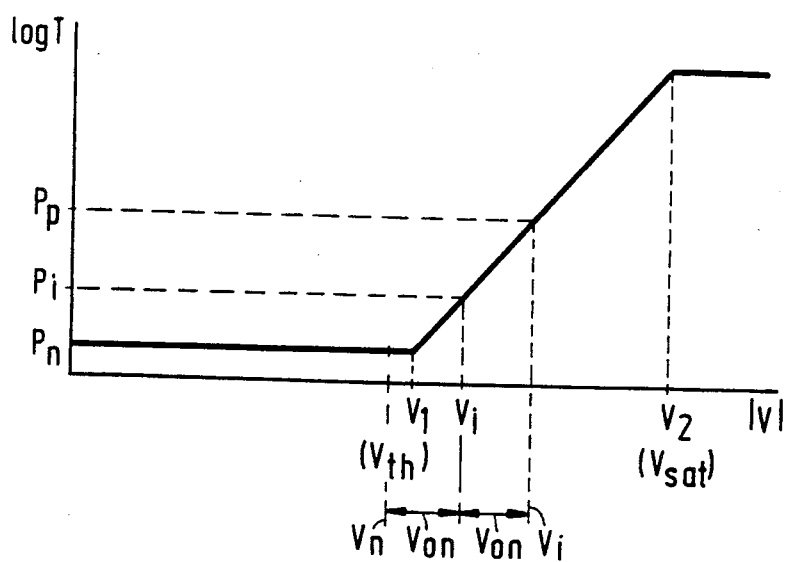
FIG. 9 shows another transmission/voltage characteristic of a display cell.

If one of the diodes 9a, 9b is short-circuited, the picture element 12 is charged too far by an amount of $V_{on}$ during positive charging, but is charged too little in an absolute sense by the same amount $V_{on}$ during negative charging. This is shown diagrammatically in FIG. 9. In this Figure the reference $P_i$ is the desired setting value of the grey scale associated with a voltage $V_i$; the references $P_p$ and $P_n$ denote the values achieved in practice during positive and negative writing, respectively, when one of the diodes 9a, 9b is short-circuited. Thus the picture element 12 flickers. However, it has been found that flicker of a single picture element is invisible or is hardly visible. Moreover, if two frames are averaged, the effective value of the voltage across the picture element is substantially equal to the desired value.

The grey scale to be set is approached all the better as the voltage drop in the forward direction across the diodes is smaller by an amount of $V_{on}$. Consequently, Schottky diodes ($V_{on} \approx 0.3$ V) are preferably used for this purpose, but pin diodes ($V_{on} \approx 0.8$ V) are alternatively suitable.

To neutralize the consequences of open connections, diodes 24a, 24b may be arranged in parallel in the same way as for switching unit 21. However, the forward characteristic of the switching unit 23 changes if one of the branches fails. This change is of the order of 18 mV for Schottky diodes. For a typical liquid crystal material (ZLI 84.460) $V_{th} = 1.5$ Volt and $V_{sat} = 3.6$ Volt. The change in this case is only 1/83 of the full range ($V_{sat} - V_{th} = 2.1$ V) and is thus substantially negligible.

If the open connections prevail, for example, because contact holes are so small that they cannot be etched open during manufacture, it is also possible to manufacture larger diodes having larger contact holes.

The above-described measures of providing redundancy in the switching units may lead to a considerably higher yield (an improvement by a factor of 100 to 1000).

The invention is of course not limited to the embodiments shown, but several variations are possible within the scope of the invention.

Non-linear switching elements other than diodes are suitable such as, for example, bipolar transistors with shortcircuited base-collector junctions or MOS transistors whose gate is short-circuited with the drain zone. There are also various possibilities for the diodes themselves. In addition to the diodes which are conventionally used in the technology for display devices, for example, a pn diode, Schottky diode or pin diode formed in monocrystalline, polycrystalline or amorphous silicon, CdSe or another semiconductor material may be considered, while the diodes may be formed both in the vertical and lateral configurations.

Moreover, the availability of a reset voltage renders the above-described device particularly suitable for use in a ferroelectric display medium as described in U.S. Pat. No. 4,840,462 in the name of the Applicant.

What is claimed is:

1. A display device comprising an electro-optical display medium between two supporting plates, a system of picture elements arranged in rows and columns, with each picture element being formed by picture electrodes arranged on the facing surfaces of the supporting plates, and a system of row and column electrodes for presenting selection and data signals by means of which a range of voltages dependent on the electro-optical display medium can be presented across the picture elements for the purpose of display, the picture electrode on one of the supporting plates is connected in an electrically conducting manner to the common point of two non-linear switching units which are arranged in series between a column electrode for data signals and an auxiliary electrode, and means for applying prior to selection, an auxiliary voltage across the picture elements beyond or on the limit of the voltage range to be used for picture display, characterized in that at least a non-linear switching unit comprises a plurality of non-linear switching elements.

2. A display device as claimed in claim 1, characterized in that a non-linear switching unit comprises two non-linear switching elements arranged in series.

3. A display device as claimed in claim 1, characterized in that a non-linear switching unit comprises a parallel arrangement of two branches each having at least one non-linear switching element.

4. A display device as claimed in claim 1, characterized in that the auxiliary voltage is beyond or on the limit of the range of transition in the transmission/voltage characteristic of the electro-optical medium.

5. A display device as claimed in claim 1 charaterized in that the non-linear switching elements are pn diodes, pin diodes or Schottky diodes.

6. A display device as claimed in claim 1, characterized in that in a row of picture electrodes each set of two juxtaposed picture electrodes are connected via a non-linear switching unit to a common auxiliary electrode, which electrode is located between the picture electrodes.

7. A display device as claimed in claim 1, characterized in that the electro-optical medium comprises a liquid crystalline material.

8. A display device as claimed in claim 1, characterized in that the electro-optical medium comprises a ferro-electric liquid crystalline material.

9. A display device as claimed in claim 2, characterized in that the non-linear switching elements are pn diodes, pin diodes or Schottky diodes.

10. A display device as claimed in claim 3, characterized in that the non-linear switching elements are pn diodes, pin diodes or Schottky diodes.

11. A display device as claimed in claim 4, characterized in that the non-linear switching elements are pn diodes, pin diodes or Schottky diodes.

12. A display device as claimed in claim 2, characterized in that in a row of picture electrodes each set of two juxtaposed picture electrodes are connected via a non-linear switching unit to a common auxiliary electrode, which electrode is located between the picture electrodes.

13. A display device as claimed in claim 3, characterized in that in a row of picture electrodes each set of two juxtaposed picture electrodes are connected via a non-linear switching unit to a common auxiliary electrode, which electrode is located between the picture electrodes.

14. A display device as claimed in claim 4, characterized in that in a row of picture electrodes each set of two juxtaposed picture electrodes are connected via a non-linear switching unit to a common auxiliary electrode, which electrode is located between the picture electrodes.

15. A display device as claimed in claim 5, characterized in that in a row of picture electrodes each set of two juxtaposed picture electrodes are connected via a non-linear switching unit to a common auxiliary electrode, which electrode is located between the picture electrodes.

16. A display device as claimed in claim 2, characterized in that the electro-optical medium comprises a liquid crystalline material.

17. A display device as claimed in claim 3, characterized in that the electro-optical medium comprises a liquid crystalline material.

18. A display device as claimed in claim 4, characterized in that the electro-optical medium comprises a liquid crystalline material.

19. A display device as claimed in claim 5, characterized in that the electro-optical medium comprises a liquid crystalline material.

20. A display device as claimed in claim 6, characterized in that the electro-optical medium comprises a liquid crystalline material.

* * * * *